United States Patent [19]

Hanson

[11] 4,399,700
[45] Aug. 23, 1983

[54] FORCE TRANSDUCER FLEXURE WITH CONDUCTORS ON SURFACES IN THE NEUTRAL BENDING PLANE

[75] Inventor: Richard A. Hanson, Woodinville, Wash.

[73] Assignee: Sundstrand Data Control, Inc., Redmond, Wash.

[21] Appl. No.: 283,340

[22] Filed: Jul. 14, 1981

[51] Int. Cl.³ .............................................. G01P 15/13
[52] U.S. Cl. .................................................. 73/517 B
[58] Field of Search ............ 73/516 R, 517 R, 517 B; 200/61.51

[56] References Cited

U.S. PATENT DOCUMENTS

| | | | |
|---|---|---|---|
| 3,229,530 | 1/1966 | Wilcox et al. | 73/517 B |
| 3,331,253 | 7/1967 | Morris | 73/517 B |
| 3,339,419 | 9/1967 | Wilcox | 73/517 B |
| 3,513,711 | 5/1970 | Rogall et al. | 73/517 B |
| 3,702,073 | 11/1972 | Jacobs | 73/517 B |
| 4,182,187 | 1/1980 | Hanson | 73/517 B |
| 4,250,757 | 2/1981 | Hanson | 73/517 B |
| 4,342,227 | 8/1982 | Petersen | 73/517 R |

Primary Examiner—James J. Gill
Attorney, Agent, or Firm—Wood, Dalton, Phillips, Mason & Rowe

[57] ABSTRACT

A flexure in a force transducer, as an inertial guidance accelerometer, for securing a force sensitive element to a mounting base includes one or more flexure sections having one or more recessed surfaces which are substantially coincident with the neutral bending plane of the flexure. Electrically conductive coating on the recessed surfaces provide electrical connections to components located on the force sensitive element. The conductive coatings on or near the neutral bending plane of the flexure sections minimizes bending moments caused by stresses set up between the conductive coatings and the flexure which may in turn lead to bias errors. At the same time, the flexure configuration provides for the desired strength and spring rate for the force sensitive element.

49 Claims, 8 Drawing Figures

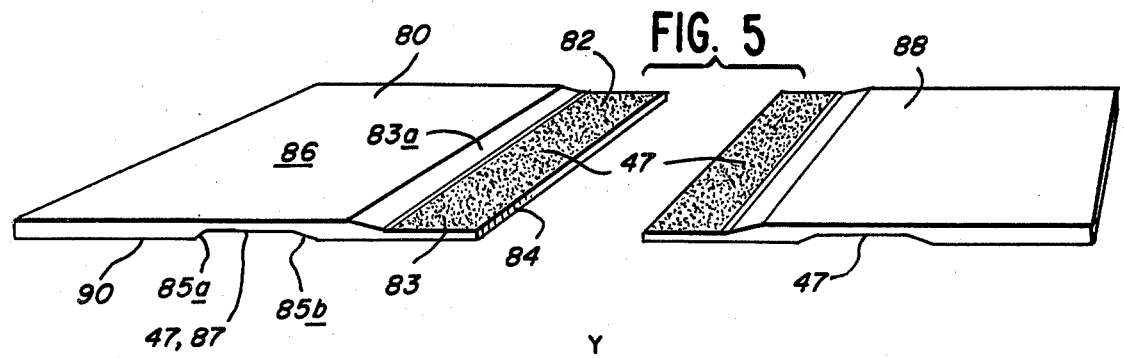
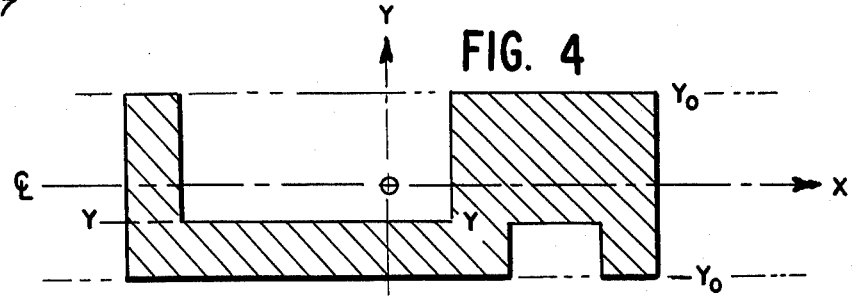
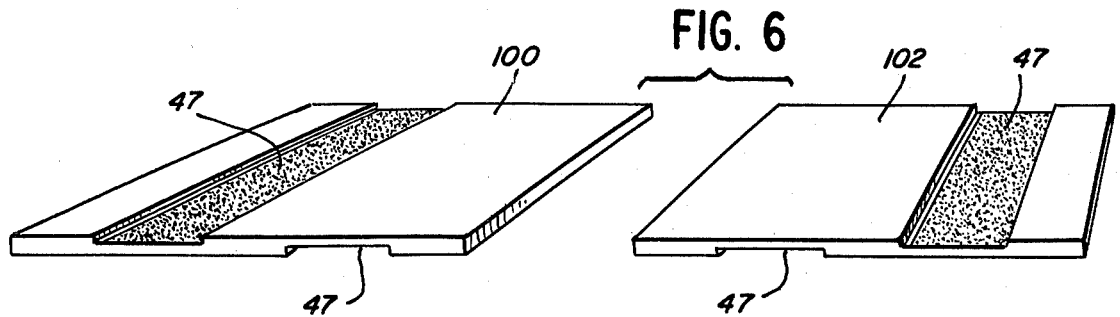
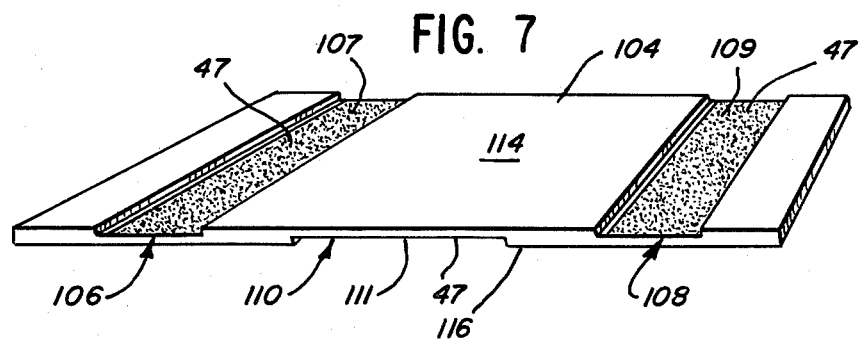
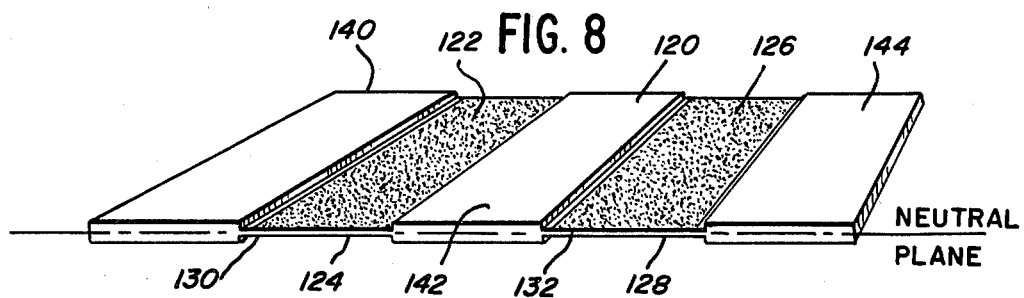

FORCE TRANSDUCER FLEXURE WITH CONDUCTORS ON SURFACES IN THE NEUTRAL BENDING PLANE

BACKGROUND OF THE INVENTION

This invention relates to the field of force sensing transducers, such as inertial guidance accelerometers, and more particularly, to a flexure for hingedly or translationally connecting a force sensing element to a mounting base.

In the type of force transducers, such as the accelerometers disclosed in Jacobs U.S. Pat. No. 3,702,073 and Hanson U.S. Pat. No. 4,182,187 and 4,250,757, a force sensing element is secured to a mounting base or ring by means of a flexure which allows the element to move in response to small forces relative to the base. In such an accelerometer, the flexure may have a bifilar construction consisting of a pair of thin planar members.

In order to provide electrical connections to components located on the sensing element, flexible leads between the base and sensing element may be used, or a thin film of conductive material may be deposited directly on the flexure or on a nonconductive coating on the flexure if the flexure itself is electrically conductive. When such materials are deposited on the flexure, stresses are set up in the flexure due to the differing temperature coefficients of the flexure and conductive materials, or by the deposition process itself. These stresses in turn result in forces which attempt to deflect the sensing element from a neutral position. In servo-loop transducers which apply to restoring force to maintain the sensing element in the neutral position, bias error is developed as a result of these stresses. In open-loop transducers where the amount of deflection of the sensing element is measured, bias error is also produced.

In those transducers which utilize conductive coatings, an effort is made to cancel out the film stresses by depositing the film equally on the upper and lower faces of the flexure sections. While this construction reduces errors to some degree, it requires a precise balancing during the deposition process so that the film thickness is equal on both sides of the flexure section. Moreover, this balancing is dependent upon film stress stability with respect to time, and is also dependent upon other factors such as ambient temperature, material purity and surface contamination.

In general, in prior transducers it has been found desirable to utilize the thinnest possible flexure consonant with strength and elasticity requirements for proper operation, so that stress effects leading to bias errors are minimized. However, it has been found that the spring rate, whether angular or linear, provided by a flexure is proportional to the cube of the thickness "t" thereof, while the bending moment of the flexure due to stress caused by deposition of the conductive strips is only proportional to t. For example, if the thickness of the flexure is reduced by 30% such that the angular spring rate provided thereby is changed from 20g/radian to 7g/radian, the error moment due to stress effects in the conductive plating is reduced by a factor of only 1.42. Hence, it can be seen that the lower limit of the range of acceptable spring rates provided by a conventional flexure will be reached well before the error moment is reduced to an insignificant value. Consequently, for these types of flexures, trade-offs must be made between obtaining the desired spring rate and flexure strength and minimizing stress effects which lead to errors.

SUMMARY OF THE INVENTION

In accordance with the present invention, a flexure has electrical conductor coating on surfaces which lie substantially on or in the neutral bending plane of the flexure.

Because the conductive material is located on a surface which lies substantially in the neutral bending plane of the flexure, stresses in the interface between the conductive film and the flexure do not lead to bias errors. This is due to the fact that the bending moment caused by such stresses is proportional to the distance of the interface from the neutral bending plane. Since this distance is substantially zero, the bending moment is minimized, and bias errors are reduced significantly if not entirely.

The flexure may consist of one or more sections, each of which contains one or more channels each having a recessed surface which lies substantially on the neutral bending plane of the flexure.

Since the conductive film is always located on or near the neutral bending plane, the magnitude of error introduced by the conductive film is essentially independent of the thickness and overall length and width of the flexure. Consequently, the flexure may be configured to provide adequate strength and the desired spring rate for the accelerometer without causing significant bias errors due to film stresses.

Related approaches to this problem are disclosed in the copending applications of Hanson and Atherton Ser. No. 283,129, filed July 14, 1981 and Hanson Ser. No. 283,141, both of which are assigned to the assignee of this application.

BRIEF DESCRIPTION OF THE DRAWINGS

FIG. 4 is a cross-section of a flexure with channels of unequal width;

FIGS. 5 and 6 are fragmentary perspective views similar to FIG. 3 showing two further embodiments of a bifilar flexure; and FIGS. 7 and 8 are fragmentary perspective views similar to FIG. 3 showing two embodiments of a single section flexure.

DETAILED DESCRIPTION OF THE INVENTION

Figure 1:
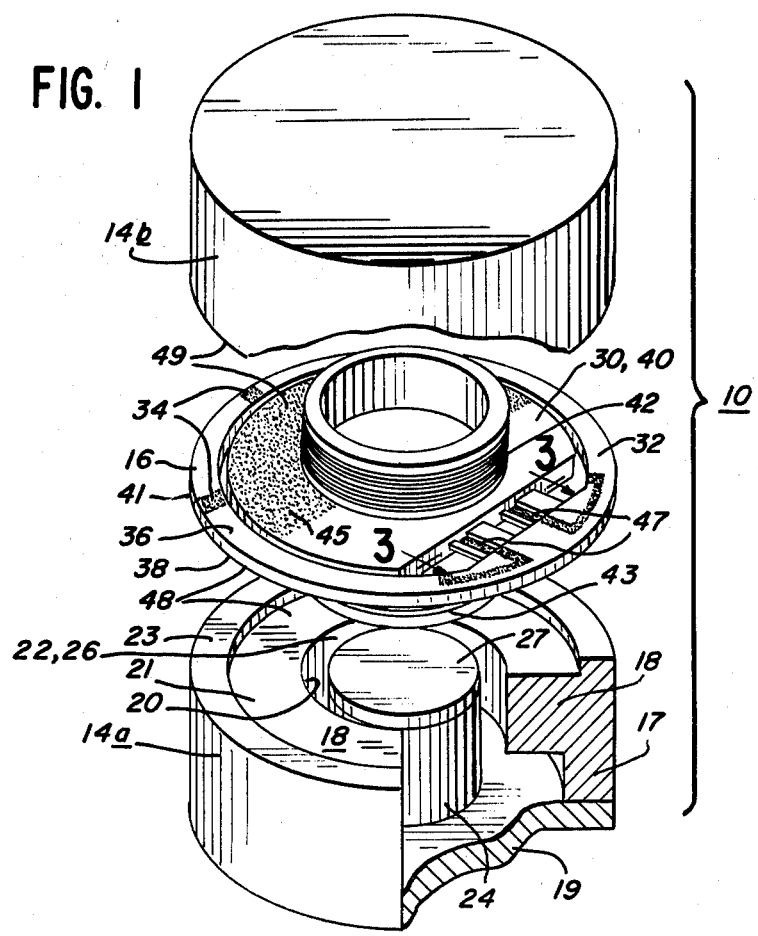
FIG. 1 is an exploded perspective view, partially in section, of an accelerometer incorporating the flexure of the present invention.
Figure 2:
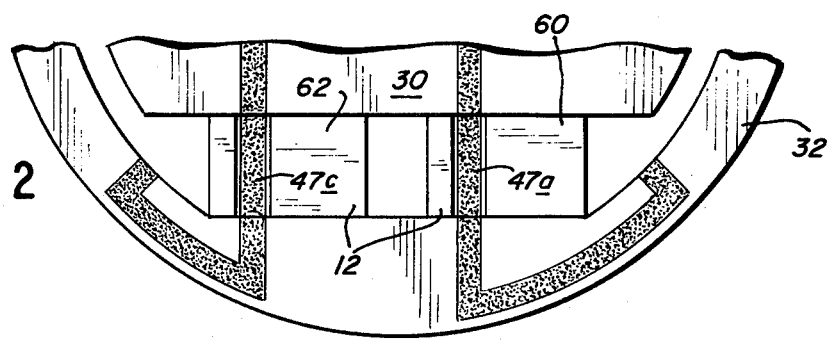
FIG. 2 is an enlarged fragmentary plan view of the flexure of FIG. 1.

Referring to FIGS. 1 and 2, there is illustrated a force transducer in the form of servoed accelerometer 10 which includes a flexure 12 according to the present invention. The accelerometer 10 is of the type disclosed in Jacobs U.S. Pat. No. 3,702,073, although the invention may be used in other force sensing transducers utilizing angular or linear motion of a force sensitive element.

The accelerometer 10 consists of a pair of cylindrical body members 14a, 14b and a proof mass assembly 16 secured therebetween.

The body members 14a, 14b are substantially identical and hence, only the body member 14a will be described. The body member 14a includes a cylindrical body wall 17 having an inwardly extending rib 18 constituting a magnetic pole piece and extending around the bottom to form a base 19. The pole piece 18 has a cylindrical inner wall 20 defining a recess 22. Secured to the plate 19 within the recess 22 is a cylindrical permanent magnet 24 which has an outer circumferential surface spaced from the inner cylindrical wall 20 to define an annular gap 26 therebetween.

The proof mass assembly 16 includes a force sensitive member or paddle 30 which is hingedly mounted by means of the flexure 12 to a mounting base or ring 32.

In the accelerometer shown in the figures, the flexure 12 allows the paddle 30 to move arcuately relative to the mounting ring 32. However, it should be understood that the flexure 12 could be used in a transducer utilizing linear motion of the sensing element along the axis of the transducer 10.

Secured to the upper and lower faces 40, 41 of the paddle 30 are a pair of force restoring, or torquer coils 42, 43, respectively. The torquer coils 42, 43 are wound on bobbins which fit within the annular gap 26 formed in each of the body members 14a, 14b when the various parts of the accelerometer 10 are assembled.

Deposited on the upper face 40 of the paddle 30 is a layer of conductive material 45. A similar layer of conductive material is deposited on the lower face 41 of the paddle 30. These electrically conductive layers form a pair of capacitor plates which interact with a face 21 of the pole piece 18 and a corresponding face of the pole piece of body member 14b, in a manner to be hereinafter described.

Three mounting pads 34 (one of which is not shown in the figures) are disposed on an upper surface 36 of the mounting ring 32. Three additional mounting pads are located axially opposite the mounting pads 34 on a lower surface 38 of the ring 32.

The mounting ring 32 is secured between the body members 14a, 14b such that a lip of the cylindrical body wall 17 and a corresponding lip on the body member 14b bear against the mounting pads, and the torquer coils 42, 43 are received within the annular gap 26 and a corresponding annular gap in the body member 14b, respectively.

A pair of variable capacitors 48, 49 are formed within the accelerometer 10, one of which consists of the face 21 and the coating on the lower surface 38, and the other of which consists of a face corresponding to the face 21 of the pole piece of the body member 14b and the coating 45 on the upper surface 36 of the paddle 30.

The conductive layers on the upper face 40 and the lower face 41, and the torquer coils 42, 43 are coupled to external circuitry by means of four conductive strips 47a—d which extend to the ring 32 across the flexure 12. The electrical connections to external circuitry are made from the ring 32 through four connector pins (not shown) located in the body walls of the body members 14a, 14b.

When the accelerometer 10 is subjected to acceleration alongs its axis, the paddle 30 moves relative to the ring 32 and the body members 14a, 14b, in turn causing a change in the capacity of the capacitors 48, 49. The change in capacity is detected by a servo-loop circuit (not shown), which in turn couples a signal proportional to the change in capacity to the torquer coils 42, 43. The resulting magnetic field set up by the torquer coils 42, 43 interacts with the magnetic field established by the permanent magnets in the body members 14a, 14b, to oppose the displacement of the paddle 30. The current required by the torquer coils 42, 43 to maintain the paddle 30 in a neutral position represents the acceleration force to which the accelerometer is subjected.

For further description of the accelerometer 10, reference should be made to Jacobs U.S. Pat. No. 3,702,073, the disclosure of which is incorporated herein.

Figure 3:
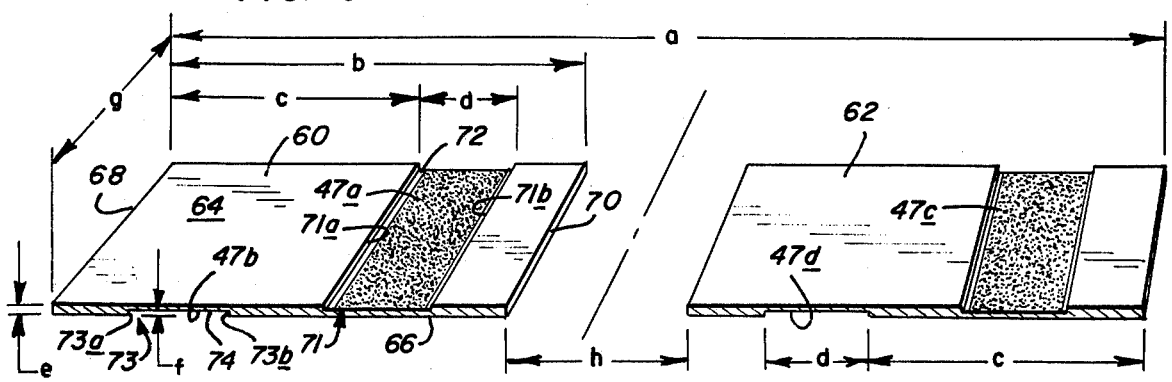
FIG. 3 is a fragmentary perspective view taken generally along line 3—3 of FIG. 1.

Referring now to FIG. 3, the preferred embodiment of the flexure 12 of the present invention is illustrated.

The flexure has a bifilar cantilever hinge configuration consisting of a pair of flexure sections 60, 62 which extend between the paddle 30 and the mounting ring 32. The sections 60 and 62 are separated by an intervening aperture which also extends between the flexure 12 and the mounting base 32.

The flexure sections 60 and 62 have substantially the same cross-section and hence only the section 60 will be described.

The section 60 includes upper and lower faces 64 and 66 which are substantially parallel to each other, and a pair of edges 68, 70 which are generally perpendicular to the faces 64, 66. The faces 64, 66 could also be non-parallel and the neutral axis channels still used.

The flexure section 60 has a pair of channels 71, 73 extending into the section 60 from the faces 64, 66,' respectively. The channels 71, 73 have recessed surfaces 72, 74, respectively, which are substantially coplanar and coincident with the neutral bending plane of the body portion 60.

The "neutral bending plane" is defined as that plane which does not experience tension or compression when the flexure is curved. For a flexure having a uniform rectangular cross-sectional configuration formed by two parallel faces and two edges such as that shown in FIG. 3, the neutral bending plane consists of points which are substantially equidistant from the faces of the flexure, i.e., the plane located midway between the faces of the flexure.

If the channels are not equal in width as shown in FIG. 3 on either individual flexure, the neutral bending axis (plane) will not bisect the flexure but will instead be offset towards the narrower channel. A cross-section of such a flexure is provided in FIG. 4. In such a case, the location of the neutral axis will be determined by the formula:

$$Y = Yo [ - (\Delta p/\Delta ul) + [(\Delta p/\Delta ul)^2 - 1]^{\frac{1}{2}}] \qquad (1)$$

where Y is a coordinate of the flexure centerline of the bottom of each channel where $\Delta p/\Delta ul \geq 1$. Yo is $\frac{1}{2}$ the overall flexure thickness. $\Delta p$ is 2×(flexure width)—(sum of the channel widths). $\Delta ul$ is (width of the upper channel)—(width of the lower channel).

It should be noted that the actual neutral bending axis is slightly out of parallel with the plane of the flexure due to the asymmetry about the individual flexure centerline and while this effect is normally small, each channel could be located so that the neutral bending axis passes through the center of the channel if the angular rotation became significant.

The channels 71, 73 also have side walls 71a, 71b and 73a, 73b, respectively. Although the channels are illustrated in FIGS. 1-3 as having planar walls 71a, 71b and 73a, 73b which are perpendicular to the faces 64, 66, these surfaces may alternatively be beveled or be of a curved configuration having a small radius. Moreover, the flexure sections may be beveled or curved in the region of their juncture with the paddle 30 and the mounting ring 32 to provide for a smooth transition therebetween, as opposed to the abrupt transition shown in FIGS. 1 and 2.

In the preferred embodiment, the paddle 30, the mounting base 32 and the flexure 12 are formed from an integral piece of fused quartz which is etched or othewise processed to the desired shape. For a detailed description of a method of manufacture of the flexure 12, reference may be had to the copending application of Kim W. Atherton, Ser. No. 283,130, filed July 14, 1981 and assigned to the assignee of this application.

Once the recessed surfaces 72, 74 have been formed, a thin layer of conductive material, such as gold, is deposited along the length of the recessed surfaces of both flexure sections so as to extend between the paddle 30 and the mounting ring 32.

The flexure 12 could alternatively be formed from electrically conductive material, in which case an electrically nonconductive coating is deposited on the flexure 12 before the conductive strips 47 are deposited.

Since the film stress bending moment is proportional to the distance and conductive strips 47 are located from the neutral bending plane or axis, then any force acting at the neutral bending plane parallel to its surface would produce no bending moment, since the distance would then equal zero. Consequently, a conductive strip deposited directly on the neutral bending axis of the flexure would not produce an error at the output of the transducer due to stresses at the interface of the conductive strip and the flexure. Since the conductive strip has a finite thickness, ideally, though not necessarily, the channel surfaces 72, 74 would be located past the neutral axis by one-half the strip thickness so that the strip itself would be centered on the neutral axis.

By way of example, the following dimensions have been found to yield satisfactory results.

| Reference Letter in FIG. 3 | Description | Dimension (in thousandths of inches unless noted otherwise) |
|---|---|---|
| a | Total width of flexure 12 | 360 |
| b | Width of each section | 150 |
| c | Distance between edge 68 and channel 71 | 90 |
| d | Width of recessed surfaces 72, 74 | 35 |
| e | Thickness of sections 60, 62 | 1.2 |
| f | Depth of neutral bending plane from faces 64, 66 | 0.6 |
| g | Length of flexure 12 | 100 |
| h | Distance between adjacent edges of sections 60, 62 | 60 |
|  | Thickness of conductive strips 47 | 2600 angstroms |

The configuration of flexure 12 in FIG. 3 is hereinafter referred to as anit-symmetric, i.e., the flexure sections have substantially the same cross-section but are not mirror images of each other.

The thickness, length and width of the flexure sections can be selected to provide adequate strength and the desired spring rate for proper operation of the accelerometer 10 without increasing significantly bias errors. Consequently, as opposed to prior transducers, the magnitude of error introduced by the conductive strips 47 is essentially independent of the dimensions of the sections. It should be noted that any channel could be designed to carry more than one isolated conductor.

Referring now to FIG. 5, there is shown an alternative embodiment for the flexure 12 which can be used if the nature of the particular force transducer configuration warranted it to increase load resistance. This embodiment differs from that shown in FIG. 3 in two respects. First, a recessed surface 82 of a channel 83 in a flexure section 80 is adjacent to an edge surface 84 with no intervening portion of an upper face 86. Secondly, a section 88 is a mirror image of the section 80, i.e., they are symmetric about the plane intersecting the space between the two sections 80, 88 and normal to the upper face 86 and a lower face 90.

The channels are shown in FIG. 5 as having beveled side walls 83a and 85a, 85b. However, these walls may be flat planar surfaces or curved surfaces, as before noted.

The recessed surface 82 and a recessed surface 87 are again located substantially on the neutral bending plane or axis of the sections 80, 88. Also, the conductive strips 47b are deposited on the recessed surfaces 82, 83 and hence, any stresses originating in the interface between the flexure and the conductive material do not cause a corresponding bending moment in the flexure.

Referring now to FIG. 6, a third embodiment is illustrated which combines selected features of the embodiments shown in FIGS. 3 and 4. This configuration could be desirable where less load resistance is required but symmetry is still desired due to the geometry of the design.

As can be seen in FIG. 6, a pair of sections 100, 102 are symmetric, i.e., are mirror images similar to the embodiment shown in FIG. 5, but have the general configuration of the sections shown in FIG. 3. It should be noted that the sections have substantially the same dimensions as the sections shown in FIG. 3.

FIG. 7 is a further embodiment of the invention similar to the embodiment of FIG. 5 but without a separating aperture between the flexure sections. This configuration could be used in a bifilar configuration where more than four electrical leads are required and the channels cannot accommodate more than one conductor; or in a single element configuration where for example there is insufficient space for a bifilar configuration wherein the wider area 110 can carry two isolated conductors. A single section flexure 104 is shown with channels 106, 108 and 110 formed having recessed surfaces 107, 109, 111, respectively. Two of the channels 106, 108 are disposed in one face 114 of the section 104 while the remaining channel 110 is disposed in the other face 116 such that the surface 111 is coplanar with and between the surfaces 107, 109. The surfaces 107, 109, 111 are each substantially located on the neutral bending plane of the flexure and the conductive strips 47 are located on the surfaces. If the width of channel 107 plus channel 109 equals the width of channel 110, the neutral bending axis is in the plane bisecting flexure 104; otherwise, the neutral bending axis is located by a formula similar to the two channel formula provided in Equation (1). This configuration also does not exhibit any neutral axis rotation relative to the plane of the flexure.

Referring now to FIG. 8, there is illustrated a further embodiment of a single section flexure which minimizes asymmetry. More than one such flexure could also be used. A section 120 includes two pairs of channels having aligned recessed surfaces 122, 124 and 126, 128, respectively. Two web portions 130, 132 are formed, one between the surfaces 122, 124 and the other between the surfaces 126, 128.

The recessed surfaces 122, 128 are substantially disposed on the neutral plane of the flexure 12 while the recessed surfaces 124, 126 are offset slightly from the neutral plane. Consequently, deposition of conductive material on the recessed surfaces 122, 124, 126, 128 will result in stresses occurring in only two of the four channels, i.e., stresses will be set up due to the conductive material in the recessed surfaces 124, 126 only. Alternatively, conductive material can be deposited on the neutral axis surfaces 122, 128 only. The location of these surfaces can be determined via a formula similar to the two channel formula of Equation (1). In any case, the proper spring rate and strength for the flexure is provided substantially by relatively thick ribs 140, 142, 144, which are located on either side of the web portions 130, 132.

As indicated above, the flexure structure of FIG. 8 could be used in a bifilar configuration wherein the configuration can either by symmetric or antisymmetric. In an antisymmetric configuration, two identical flexures of the type shown in FIG. 8 can be used with the conductive material deposited only on the neutral axis surfaces 122 and 128 of both flexures.

In another arrangement, the flexure of FIG. 8 can be configured such that both the recessed surfaces on one side of the flexure such as 124 and 128 are disposed on the neutral plane of the flexure. Additionally, flexures of this type need not have parallel surfaces, but could be for example tapered towards the force sensing element to produce a constant strength flexure.

It should also be noted that the approach described above for reducing the stress effect of a coating on a flexure element can be used with a flexure structure that is not necessarily the primary support of the force sensing element. Such a structure connecting a force sensing element to a mounting base would still require some structural integrity while producing minimum bias forces or moments. Additionally, it should be understood that even though the flexure structure illustrated in FIGS. 1-4 shows the thin portion 56 of the flexure configured as one piece with the thicker ribs 58 and 60, it may not be necessary for some applications of the invention to have the thin portion 56 carrying the conductive strips 47 physically connected to the support ribs 58 or 60.

The various embodiments of the invention as described above contemplate that the various channels aligned with the neutral bending axis of the flexure are located on flexures that provide the primary support of the force sensitive member 30 with respect to the mounting base 32. However, the concept of depositing an electrically conductive material such as the conductive strips 47 along the neutral bending axis of a flexure would apply to a non-load bearing flexure or bendable member as well.

It should also be noted that even though the various embodiments of the invention illustrated show the channels extending from the force sensitive member 30 to the mounting base 32, the invention includes placing the electrically conductive material 47 on just a portion of the neutral bending axis of the flexure preferably where the minimum strength of the flexure is required in order to minimize the stresses induced by the conductive strips 47.

I claim:

1. A force measuring transducer comprising:
a mounting base;
a force sensitive member including an electrical element;
a flexible member having one end secured to said mounting base and other end secured to said force sensitive member; and
an electrically conductive material disposed on said flexible member and extending between said electrical element and said mounting base wherein at least a planar portion of said electrically conductive material is disposed on a portion of said flexible member and the portion of said flexible member is in substantial alignment with the neutral bending axis of said flexible member.

2. A force measuring transducer comprising:
a mounting base;
a force sensitive element including an electrical element;
a flexible member having one end secured to said mounting base and other end secured to said force sensitive member; and
an electrically conductive material disposed on said flexible member and extending between said electrical element and said mounting base wherein at a portion of said electrically conductive material disposed on said flexible member is in substantial alignment with the neutral bending axis of said flexible member wherein said portion of said electrically conductive material disposed on said flexible member in alignment with the neutral bending axis extends substantially the entire length of said flexible member.

3. The transducer of claim 1 or 2 wherein approximately one-half of said electrically conductive material disposed in alignment with said neutral bending axis is located above said neutral bending axis and the remaining electrically conductive material is located below said neutral bending axis.

4. In a transducer having a mounting base and a force sensitive member having an electrical element, a flexure for securing the member to the mounting base, comprising:
a flexure section having one end secured to the force sensitive member and the other end secured to the mounting base;
a channel configured in said flexure section with a recessed surface extending at least a portion of the distance between the force sensitive member and the mounting base wherein at least a planar portion of said recessed surface is substantially aligned with the neutral bending axis of said flexure section; and
an electrically conductive material disposed on said recessed surface and extending between the electrical element on the force sensitive member and said mounting base.

5. The flexure of claim 4 wherein said recessed surface extends substantially the entire length of the flexure from the force sensitive member to the mounting base.

6. In a transducer having a mounting base and a force sensitive member having an electrical element, a flexure for securing the member to the mounting base, comprising:
a flexure section having one end secured to the force sensitive member and the other end secured to the mounting base;
a channel configured in said flexure section with a recessed surface extending at least a portion of the distance between the force sensitive member and the mounting base wherein at least a portion of said recessed surface is substantially aligned with the neutral bending axis of said flexure section; and an electrically conductive material disposed on said recessed surface and extending between the electrical element on the force sensitive member and said mounting base, wherein said electrically conductive material is disposed on said recessed surface such that said electrically conductive material is aligned substantially along said neutral bending axis.

7. In a transducer having a mounting base and a force sensitive member having an electrical element, a flexure for securing the member to the mounting base, comprising:

a flexure section having one end secured to the force sensitive member and the other end secured to the mounting base;

a channel configured in said flexure section with a recessed surface extending substantially the entire length of the flexure from the force sensitive member to the mounting base wherein at least a portion of said recessed surface is substantially aligned with the neutral bending axis of said flexure section; and an electrically conductive material disposed on said recessed surface and extending between the electrical element on the force sensitive member and said mounting base and wherein said portion of the recessed surface substantially aligned with said neutral bending axis extends substantially the entire length of said recessed surface.

8. The flexure of claim 4, 6, 5 or 7 wherein approximately one-half of said electrically conductive material is located above said neutral bending axis and the remaining electrically conductive material is located below said neutral bending axis.

9. In a transducer having a mounting base and a force sensitive member having an electrical element, a flexure for securing the member to the mounting base, comprising:

at least one flexure section having a pair of faces extending between said member and said mounting base;

at least one channel having a recessed surface extending into said section from one of said faces, said recessed surface being substantially aligned with the neutral bending axis of said flexure section; and an electrically conductive material disposed on said recessed surface extending between said force sensitive member and said mounting base.

10. The flexure of claim 9, wherein a channel is disposed in each of said faces such that each of said recessed surfaces of the channels lie substantially along the neutral bending axis of said flexure section.

11. The flexure of claim 10, wherein said flexure section further includes a pair of edge surfaces extending between said force sensitive member and said mounting base, and wherein said channels are spaced away from said edge surfaces.

12. The flexure of claim 9, wherein a first channel is disposed in one face and second and third channels are disposed in the other face such that the recessed surfaces of at least two of the channels lie substantially in the plane of said neutral bending axis.

13. The flexure of claim 9, wherein the recessed surface of the first channel is located between the recessed surfaces of the second and third channels, said recessed surfaces all lying substantially in the plane of said neutral bending axis.

14. The flexure of claim 9 wherein two channels are disposed in each face such that two of said recessed surfaces of the channels lie substantially along the neutral bending axis of said flexure section.

15. The flexure of claim 14 wherein said channels having recessed surfaces along the neutral bending axis are disposed in opposite faces of the flexure section.

16. The flexure of claim 15 wherein each of said channels having recessed surfaces along the neutral bending axis are substantially aligned with one of the channels in the other face of the flexure section.

17. The flexure of claim 14 wherein said channels having recessed surfaces along the neutral bending axis are disposed in the same face of the flexure section.

18. The flexure of claim 17 wherein said channels having recessed surfaces along the neutral bending axis are disposed in substantial alignment with said channels in the other face of the flexure section.

19. The flexure of claim 9, 10, 11, 12, 13, 14, 15, 16, 17 or 18 additionally including a second flexure section configured in an antisymmetric configuration with respect to the first flexure section.

20. The flexure of claim 9, 10, 11, 12, 13, 14, 15, 16, 17 or 18 additionally including a second flexure section configured in a symmetric configuration with respect to the first flexure section.

21. In an accelerometer having a mounting base and a paddle having an electrical component, a flexure for securing the paddle to the base, comprising:

a flexure section having a pair of faces extending between said paddle and said mounting base;

first and second channels each having a recessed surface extending into said section from each of said faces, said recessed surfaces being substantially coplanar but laterally spaced and located substantially on the neutral bending axis of said flexure section; and an electrically conductive coating on the recessed surfaces extending between the paddle and the mounting base.

22. The flexure of claim 21, wherein the flexure further includes a second section extending between the paddle and the mounting base which is separated from the first section by an intervening aperture wherein said second flexure section is substantially identical to the first flexure section but has an anti-symmetric relationship therewith.

23. The flexure of claim 22, wherein the second flexure section is a mirror image of the first section such that the second section is symmetric to the first section with respect to a plane bisecting said aperture and normal to said faces.

24. The flexure of claims 21, 22 or 23, wherein said electrically conductive coating on said recessed surface is located in substantial alignment with the neutral bending axis of said flexure section.

25. In an accelerometer having a mounting base and a paddle which carries a first restoring coil, a flexure for securing the paddle to the mounting base, comprising:

first and second flexure sections separated by an intervening aperture, said sections extending between said paddle and said mounting base;

said flexure sections having upper and lower faces terminating in first and second edge surfaces;

a first channel having a first recessed surface extending into said first section from said upper face, said first recessed surface being disposed closer to said first edge surface than said second edge surface;

a second channel having a second recessed surface extending into said first section from said lower face, said second recessed surface being disposed closer to said second edge surface than said first edge surface;

said first and second recessed surfaces being substantially coplanar and coincident with the neutral bending plane of the flexure section; and an electrically conductive coating on the recessed surfaces extending between the mounting base and the paddle.

26. The flexure of claim 25, wherein the second flexure section is substantially identical to the first flexure section but has an anti-symmetric relationship therewith.

27. The flexure of claim 25, wherein the second flexure section is substantially a mirror image of the first section such that the second section is symmetric to said first section with respect to a plane bisecting said aperture and normal to said faces.

28. The flexure of claim 26, wherein the width of each flexure section is approximately one and one-half times the length thereof.

29. The flexure of claim 26, wherein the depth of the channels is substantially one-half the distance between the faces of the sections.

30. The flexure of claim 26, wherein the distance between the faces of each section is on the order of one one-hundredth the length of each section.

31. The flexure of claim 26, wherein the distances between the faces of each section is approximately 0.0012 inch.

32. The flexure of claim 31, wherein the recessed surface is located approximately 0.0006 inch from each face.

33. The flexure of claim 32, wherein the length of each flexure section is approximately 0.100 inch and the width thereof is approximately 0.150 inch.

34. The flexure of claim 33, wherein the width of each recessed surface is approximately 0.035 inch.

35. The flexure of claim 34, wherein the distance between adjacent edge surfaces of the first and second flexure sections is approximately 0.06 inch.

36. In a transducer having a mounting base and a force sensitive member having an electrical element, a flexure for securing the member to the mounting base, comprising:

at least one flexure section having a pair of faces extending between said member and said mounting base;

at least one channel having a recessed surface extending into said section from one of said faces, said recessed surface being spaced substantially equidistance from said faces; and an electrically conductive material disposed on said recessed surface extending between said force sensitive member and said mounting base.

37. The flexure of claim 36, wherein a channel is disposed in each of said faces such that the recessed surfaces of the channels lie substantially in a single plane.

38. The flexure of claim 37, wherein said flexure section further includes a pair of edge surfaces extending between said force sensitive member and said mounting base, and wherein said channels are spaced away from said edge surfaces.

39. The flexure of claim 36, wherein a first channel is disposed in one face and second and third channels are disposed in the other face such that the recessed surfaces of at least two of the channels lie substantially in a single plane.

40. The flexure of claim 39, wherein the recessed surface of the first channel is located between the recessed surfaces of the second and third channels, said recessed surfaces all lying substantially in a single plane.

41. The flexure of claim 39, further including a fourth channel disposed in the one face such that the recessed surface of one of the channel in the one face lies in a common plane with the recessed surface of one of the channels in the other face, said common plane being spaced substantially equidistant from the faces of said main body.

42. In an accelerometer having a mounting base and a paddle having an electrical component, a flexure for securing the paddle to the base, comprising:

a flexure section having a pair of faces extending between said paddle and said mounting base;

first and second channels each having a recessed surface extending into said section from each of said faces, said recessed surfaces being substantially coplanar but laterally spaced and substantially equidistant from the faces; and an electrically conductive coating on the recessed surfaces extending between the paddle and the mounting base.

43. The flexure of claim 42, wherein the flexure section further includes a pair of edge surfaces extending between said paddle and said mounting base, and wherein said channels are spaced away from said edge surfaces.

44. The flexure of claim 43, wherein the flexure further includes a second section extending between the paddle and the mounting base which is separated from the first section by an intervening aperture.

45. The flexure of claim 44, wherein the second flexure section is substantially identical to the first flexure section but has an anti-symmetric relationship therewith.

46. The flexure of claim 44, wherein the second flexure section is substantially a mirror image of the first section such that the second section is symmetric to the first section with respect to a plane bisecting said aperture and normal to said faces.

47. The flexure of claim 42, further including a third recessed surface defining a third channel extending into said section from one of the faces, all of said recessed surfaces being substantially coplanar but laterally spaced from the faces.

48. The flexure of claim 47, wherein the first recessed surface of the channel in one of the faces is between the recessed surfaces of the channels in the other face.

49. The flexure of claim 42, further including:

a pair of additional channels each having an additional surface in each of said faces, one of said additional surfaces being aligned substantially opposite said first recessed surface and the other of said additional surfaces being aligned opposite said second recessed surfaces.

* * * * *